April 10, 1962     E. A. EBERT     3,028,688
FISH LURE DISPLAY AND TEST TANK
Filed Feb. 24, 1959     3 Sheets-Sheet 1
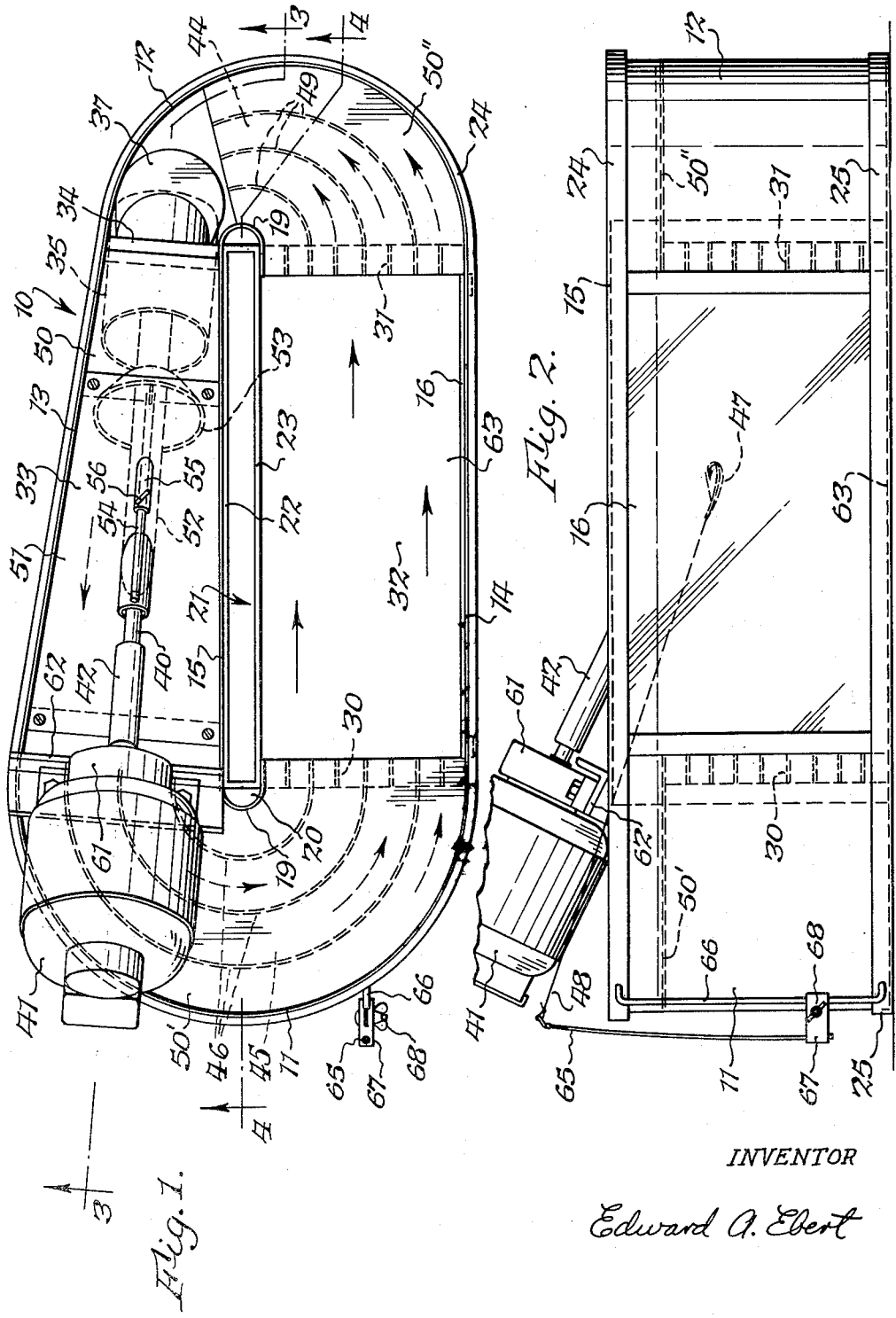
INVENTOR
Edward A. Ebert

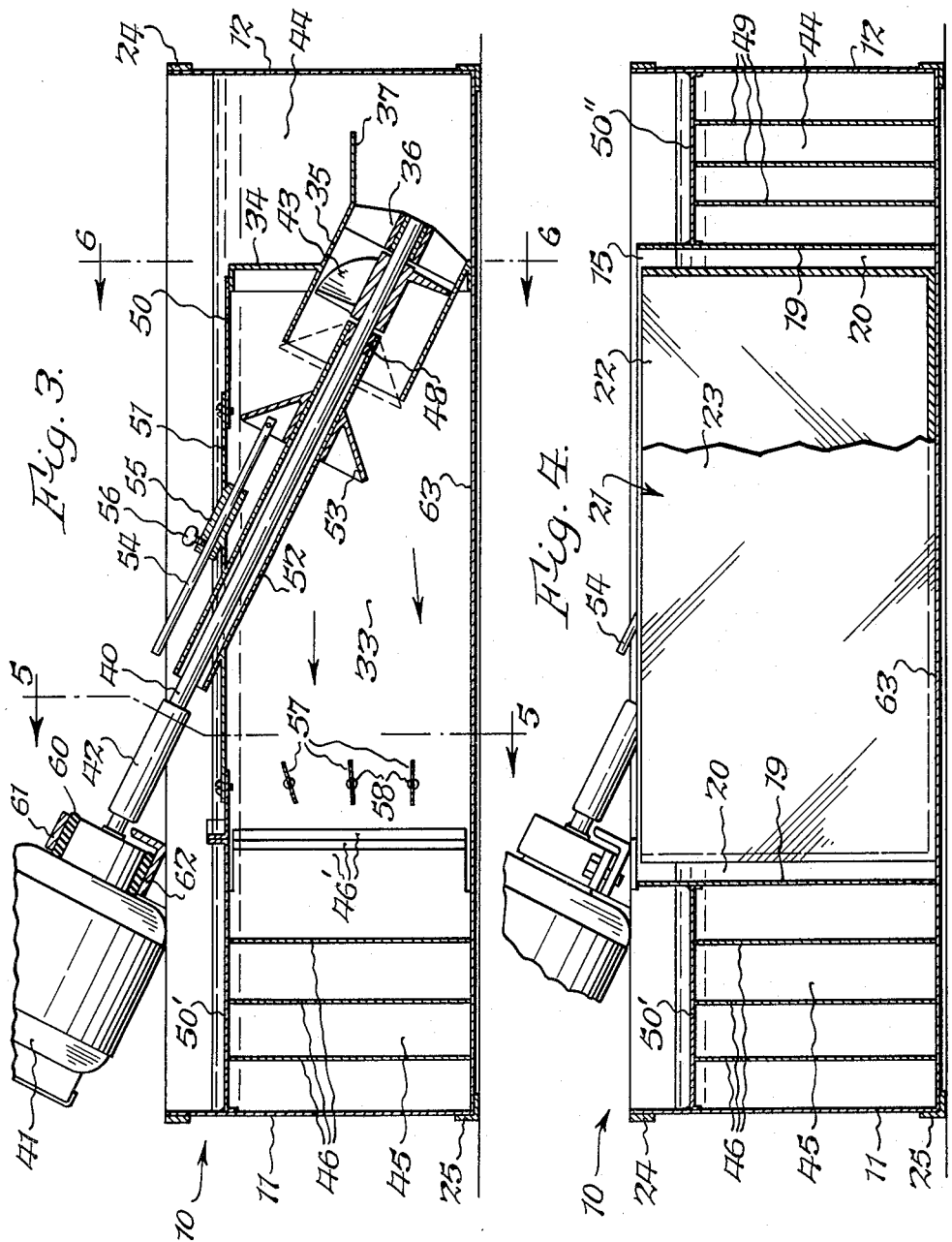

April 10, 1962   E. A. EBERT   3,028,688
FISH LURE DISPLAY AND TEST TANK
Filed Feb. 24, 1959   3 Sheets-Sheet 3
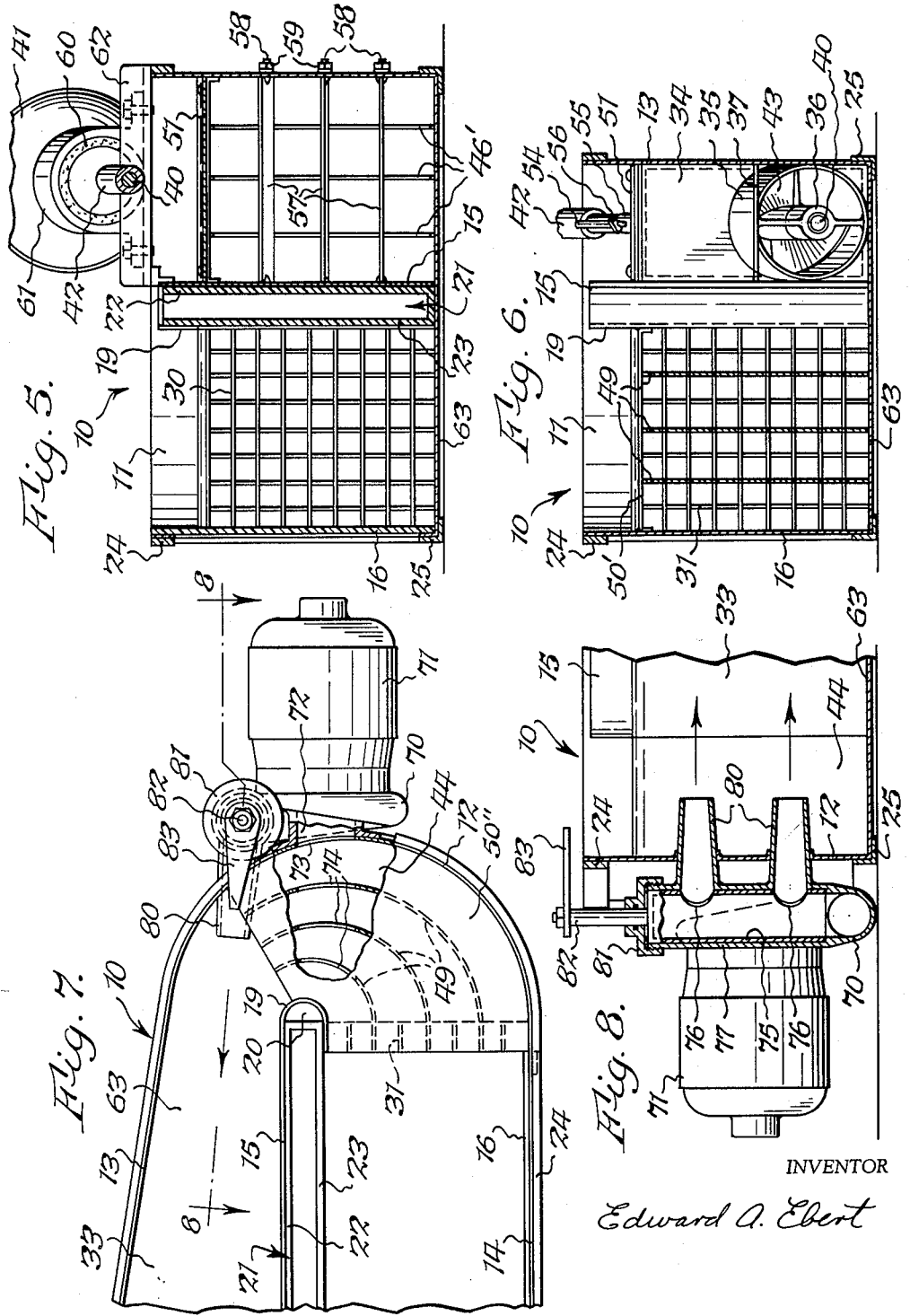
INVENTOR
Edward A. Ebert United States Patent Office 3,028,688
Patented Apr. 10, 1962

3,028,688
FISH LURE DISPLAY AND TEST TANK
Edward A. Ebert, 203 Huxley Drive, Snyder, N.Y.
Filed Feb. 24, 1959, Ser. No. 795,160
7 Claims. (Cl. 35—49)

My invention relates to tanks used in connection with either the display of fishing lures or the testing thereof for improvement in their design or the origination of completely new designs. More particularly this invention relates to the construction of a device capable of duplicating the conditions as completely as is possible, that actually exist when lures are used in fishing. Also to make possible a visual observation under these actual conditions for the purpose of gaining knowledge and/or showing the advantages of a particular lure over another or to show a special action of a lure to induce the interest of a customer in its purchase.

In checking or observing the action of a fishing lure from a boat or shore line, the observer is always at the disadvantage of being at a remote distance from the lure, and further, the optical distortion caused by wave action at the surface of the water always gives the illusion of action, even though the lure might be inactive. Further, the lure can only be observed from above, it being quite impractical for the observer to follow the lure under water.

It is therefore a prime object of the invention to provide a device wherein a flow of water is moved through a duct having a transparent section for visual observation of the action of an object, such as a fishing lure, in the flow of water.

A second object is to provide a flow of water in a duct which is adjustable as to the speed of flow and which flow is at a steady and uniform speed throughout its cross sectional area.

A third object is to provide a compact device having a closed circuit duct work for recirculating the water in its tank to reduce its power requirements.

Another object is to provide for more compact construction wherein only a part of the water in the tank flows through a pump, the other part being free to recirculate past the pump.

A further object is to provide a construction which permits observation of the lure or subject with a suitable background, such as aquatic plants or other underwater life, this background being in the form of a separate container.

A still further object is to be able to use advertising matter as a background in this same container, to keep the advertising matter from becoming wet.

The various features of novelty which characterize my invention are pointed out with particularity in the claims annexed to and forming a part of this specification. For a better understanding of my invention, its operating advantages and specific objects attained by its use, reference should be had to the accompanying drawings and descriptive matter in which there is illustrated and described a preferred embodiment of the invention.

In the accompanying drawings:

FIG. 1 is a top plan view of the invention;
FIG. 2 is a side elevation;
FIG. 3 is a vertical, longitudinal section taken along the line 3—3, FIG. 1;
FIG. 4 is a vertical, longitudinal section taken along the line 4—4, FIG. 1;
FIG. 5 is a vertical, cross sectional view taken along line 5—5, FIG. 3;
FIG. 6 is a vertical, cross sectional view taken along line 6—6, FIG. 3;
FIG. 7 is a plan view similar to FIG. 1 showing another form of pump arrangement; and
FIG. 8 is a vertical, sectional view taken along the line 8—8, FIG. 7.

In the illustrated embodiment of the invention, an elongated tank 10 filled with water to the level shown and having rounded ends 11 and 12 is shown. A back wall 13 and a front wall 14 are provided with a divider wall 15 located between and resting on the tank bottom 63. The front wall 14 may be provided with a transparent window 16 suitably glazed to the front wall 14 to prevent leakage of water from the tank. Divider 15 has turned-in end walls 19 to provide a pocket 20 into which a rectangular container 21 may be inserted. This container comprises an opaque wall 22 and a transparent wall 23, the purpose of which will be later fully explained. An upper frame member 24 and a lower frame member 25 encircle the tank walls to adequately reinforce the side walls against water pressure from the inside.

At the juncture of the larger rounded end 11 with the front wall 14 is located an exit grid 30 and also at the juncture of the smaller rounded end 12 with this front wall 14 is located an intake grid 31. These grids form the sides while the container 21 forms the back of a stage area 32 when viewed through the window 16.

The back wall 13 is disposed between the large rounded end 11, and the smaller rounded end 12 of the tank 10 and inclines toward the divider wall 15 is a horizontal direction to form a sluiceway 33. At its narrowest end the sluiceway is provided with a vertical wall or dam 34 having an angularly disposed, cylindrical pump duct 35 at its lowermost end, which duct is supplied with a bracket and bearing 36 and an anti-cavitation plate 37. Disposed in the duct 35 and rotatably mounted in the bearing 36 is a shaft 40 driven by a motor 41 through the coupling 42. The motor 41 is supported in a rubber mount 60 held by a strap 61 which is bolted to a cross frame member 62. At its lower end within the duct 35 the shaft 40 carries a propeller 43. When the motor 41 is energized, the propeller 43 draws water through the duct 35 in the direction of the arrows, as shown in FIGS. 1 and 3, from the turnabout area 44 at the right and delivers it into the diverging sluiceway 33.

Since the water becomes quite turbulent, and its velocity is increased as it goes through the cylindrical duct 35, when acted upon by the propeller 43, the diverging walls cause a slowing down of the velocity and turbulence to a steady flow which is necessary for proper operation of the tank. At the widest end of the sluiceway 33 adjustable, horizontal blade deflectors 57 are provided. By angular adjustment the flow of water can be deflected up or down to equalize the flow in a vertical direction. Threaded end shafts 58 extend through the wall 13 and may be locked against rotation by lock nuts 59. The water then flows to the larger turnabout area 45 which has vertical deflectors 46 which guide the water around the divider end 19 where it then must pass through the exit grid 30. The forward ends 46' of the deflectors 46 are left unfastened to the top wall 50' or bottom wall 63, as shown in FIG. 3, thus permitting adjustment by bending to equalize the flow in a horizontal direction. The grid 30 alines the water into a straight flowing stream before it emerges into the stage area 32, where the lures or objects 47 being observed or tested are located. The water then passes across this area 32 into an intake grid 31, this grid serving to prevent interaction of the suction at this point with the straight flowing water in the area 32. The water then is increased in velocity as it goes through the turnabout area 44 by the increasingly confining curve of the small tank end 12, where the water then again enters the cylindrical pump duct 35. Area 44 also has vertical deflectors 49 equally spaced between the right divider end 19 and the tank end wall 12. As will be noted, obstructions of any sort have been minimized as much as possible to prevent the creation of any sporadic eddies or turbulence of the water in flowing through the tank, especially in the stage area 32. This is necessary to obtain a true picture of the action of any lure or object 47 under observation so that its action is not caused or influenced by spurious water currents.

As is best shown in FIGS. 3 and 4, the sluiceway 33 is confined by a top plate 50 as are the turnabout areas 44 and 45, by plates 50' and 50". The plates 50 and 50' confine the water where it is under greater head to prevent it from rising over the top edge of the tank 10. Plate 50 also provides support for a removable closure plate 51 which mounts a tube 52 surrounding the propeller shaft 40. At its end nearest the propeller 43 a bearing sleeve 48 is provided. This sleeve 48 also acts as a water seal to prevent water from gushing up the tube toward the motor 41. A conical valve member 53 is slidably mounted on the tube 52 and adjustably restrained in position by a rod 54 which passes through the boss 55 and is held by a thumb screw 56. By moving the rod 54 toward the cylindrical duct 35 the flow of water is checked in velocity, and reversal of this movement opens the valve and increases the flow of water throughout the tank.

The container 21 as previously mentioned is contained in the pocket 20 of the divider 15 and is removable. It is a waterproof structure which when placed in the pocket 20 empty and dry, and with its transparent wall 23 forward, may contain advertising matter or printed scenery or indicia forming a suitable background for the stage area 32. When it is desired that all accentuation and attention should be placed on the object or lure being demonstrated, the container 21 may be reversed and placed with its opaque side 22 forward. I have found that when this wall 22 is made of black plastic and the grids 30 and 31 and the floor 63 of the stage area 32 are painted black, an extremely effective showing is made of the color of any natural polished metallic lure.

When it is desirable to have a natural setting, the container 21 is used with its transparent wall 23 forward and it is filled with water and aquatic plants and life such as snails and fish. When used in this manner it has been found that this tank will successfully induce the urge of people to possess the lure displayed.

To improve and make more authentic the action of a lure 47 displayed, a vertically adjustable fishing rod tip 65 to which the lure is tied by line 48, is provided at the rounded end 11 of the tank 10 and comprises a vertical slide bar 66 fastened at the top and bottom to the frame members 24 and 25 and having a slide member 67 which carries the rod tip 65, and may be clamped by a thumb nut 68 at whatever elevation is desired on the slide bar 66. Slide member 67 is drilled and slotted as shown for effective engagement with the slide bar 66. Adjustment of this rod tip 65 is necessary since some lures run deep and others either float or are shallow running.

A modified form of my invention is shown in FIGS. 7 and 8, wherein the tank parts are identical to the form just described and therefore the drawings bear the same parts numerals, the only exception being the pump and its associated parts which will now be described.

The end wall 12 of the tank 10 has attached thereto a close coupled centrifugal pump 70 driven by a motor 71. The pump inlet 72 connects with an opening 73 in the end wall 12 and thereby communicates with the turnabout area 44. Opposite this opening 73 and the pump inlet 72 the deflectors 49 are provided with openings 74 which permit water to be taken into the pump from all of the water channels between the deflectors 49 and yet will still guide around the turnabout area 22 what water is not taken by the pump inlet 73. The pump 70 has a vertical discharge manifold 77 in which is provided a tubular sleeve valve 75 having port openings 76 which aline with nozzles 80 which extend from the manifold 77 through the wall 12 and into the area of the tank where the turnabout area 44 joins with the sluiceway 33. A cap 81 is threaded to the upper end of the manifold and suitable packing is provided around the valve stem 82 which has at its extreme end a valve handle 83 for controlling the flow of water out of the nozzles 80. As will be seen in FIG. 7, the nozzles are directed along a center line of the diverging sluiceway 33 and a jet action takes place whereby the high speed water flowing out of the nozzles 80 induces a flow movement into the water which is circulating in the tank and maintains this circulation. In this form of the invention only a portion of the water is run through the pump while in the first form all of the water is acted upon by the pump.

The invention just disclosed provides a simple and compact device suitable for test purposes or the demonstration of lures for sale and may be easily and quickly converted from one to the other.

It will be understood that various changes in the details and conditions which have been hereinabove described in order to explain the nature of the invention may be made by those skilled in the art within the principle and scope of the invention as expressed in the appended claims.

I claim:

1. An observation tank comprising a bottom wall, side walls and rounded end walls, having a divider lengthwise of its approximate center to separate the space between said side walls into front and rear ducts, said divider having its ends turned in to cooperate with the rounded end walls of said tank to provide large and small turnable areas, said side wall of said front duct having a transparent section and being positioned parallel to said divider providing said front duct with constant volume, while said rear duct has its side wall set at an angle, to provide a reducing volume from one end to the other, said large turnable area connecting one end of each of said front and rear ducts and said small turnable area connecting the other end of each said front and rear ducts, providing a closed circuit ductwork of varying volume, a water flow inducing means positioned at the point of reduced volume in said ductwork, causing water of high velocity to flow in said rear duct reducing in speed and turbulence as it flows toward its large volume end due to its divergence to a larger cross sectional area, until it passes into said large turnabout area and emerges, past an exit grid into said front duct at a uniform rate of flow where it activates an hydraulic device under observation, said hydraulic device being restrained in position by an anchoring line, said flow then passing through an inlet grid entering said small turnable area and increasing in velocity as it flows to said point of reduced volume, said bottom wall, said divider wall and said inlet and exit grids forming a stage area for observation of the action of said hydraulic device.

2. An observation tank comprising a bottom wall, side walls and rounded end walls, having a divider lengthwise of its approximate center to separate the space between said side walls into front and rear ducts, said divider having its ends turned in to cooperate with the rounded end walls of said tank to provide large and small turnabout areas, said side wall of said front duct having a transparent section and being positioned parallel to said divider providing said front duct with constant volume, while said rear duct has its side wall set at an angle, to provide a reducing volume from one end to the other, said large turnabout area connecting one end of each of said front and rear ducts and said small turnabout area connecting the other end of each said front and rear ducts, providing a closed circuit ductwork of varying volume, a water flow inducing means positioned at the point of reduced volume in said ductwork, causing water of high velocity to flow in said rear duct reducing in speed and turbulence as it flows toward its large volume end due to its divergence to a larger cross sectional area, until it passes into said large turnabout area and emerges past an exit grid into said front duct at a uniform rate of flow where it activates a fishing lure under observation, said lure being restrained in position by an anchoring line, said flow then passing through an inlet grid entering said small turnable area and increasing in velocity as it flows to said point of reduced volume, said bottom wall, said divider wall and said inlet and exit grids forming a stage area for observation of said fishing lure action.

3. A device as set forth in cliam 2, wherein said anchoring line has its other end tied to a fishing rod tip hsaving such flexibility as is customarily used in fishing such a lure being observed, said flexibility of action to add or substract from its action.

4. A device as set forth in claim 3, wherein said fishing rod tip is vertically adjustably mounted on one of said side walls of said tank, to make possible the positioning of said lure at the center of said stage area.

5. A display tank comprising a bottom wall, side walls and curved end walls, said tank having a divider lengthwise along its middle, said divider being provided with turned-in ends for guiding and holding a container having at least one transparent side, said container having indicia located therein, said divider and its turned-in ends cooperating with the said curved end walls to form a pair of turnabout ducts which connect the ends of a front and rear duct provided by said divider, to form a closed circuit for the flow of water therein, said front duct having a transparent section and said rear duct having a flow-inducing means, said transparent section permitting observation of a lure or similar object in said flow of water with said indicia visible in the background.

6. A display tank comprising a bottom wall, side walls and curved end walls, said tank having a divider lengthwise along its middle, said divider being provided with turned-in ends for guiding and holding a removable water-tight container having at least one transparent side, said divider and its turned-in ends cooperating with the said curved end walls to form a pair of turnabout ducts which connect the ends of a front and rear duct provided by said divider, to form a closed circuit for the flow of water therein, said front duct having a transparent section and said rear duct having a flow-inducing means, said transparent section giving vision to a stage area, the vision of said stage area being limited by said bottom wall, an intake grid at one end, an exit grid at the other, said grids acting besides flow grids as side curtains limiting side vision and at its back by said removable container or said divider forming the background, for observation of an activated fish lure or other object in said flow of water in the said stage area.

7. A device as set forth in claim 6, wherein the other side wall of said removable container has an opaque, black, light-absorbing finish and is positioned in said turned-in ends of said divider, so that said black finish is visible through said transparent section of said front duct, said bottom wall and said intake and exit grids also having a similar black light-absorbing finish, all to accentuate the natural finish and action of the lure or object under observation.

References Cited in the file of this patent

UNITED STATES PATENTS

| | | |
|---|---|---|
| 1,234,323 | Foss | June 24, 1917 |
| 1,630,797 | Markwick | May 31, 1927 |
| 1,884,075 | Meyers | Oct. 25, 1932 |
| 2,382,999 | Lee | Aug. 21, 1945 |
| 2,629,188 | Renwick | Feb. 24, 1953 |
| 2,831,345 | Wolf et al. | Apr. 22, 1958 |

FOREIGN PATENTS

| | | |
|---|---|---|
| 71,996 | Norway | Apr. 21, 1947 |